(12) United States Patent
Delmas et al.

(10) Patent No.: US 6,813,840 B1
(45) Date of Patent: Nov. 9, 2004

(54) RECTROREFLECTING METROLOGY TARGET MARKER DEVICE

(75) Inventors: Jean-François Delmas, Linas (FR); Christophe Brouard, Vernou la Celle S/Seine (FR); Alain Benoit, Morestel (FR); Jean-Paul Duranthon, Decines (FR)

(73) Assignees: Regie Autonome des Transports Parisiens, Baris Cedex (FR); Laboratoire Central des Ponts et Chaussees, Bouguenais (FR)

( * ) Notice: Subject to any disclaimer, the term of this patent is extended or adjusted under 35 U.S.C. 154(b) by 0 days.

(21) Appl. No.: 09/605,390

(22) Filed: Jun. 28, 2000

(30) Foreign Application Priority Data

Jun. 30, 1999 (FR) .............................................. 99 08399

(51) Int. Cl.$^7$ ............................................. G01C 15/02
(52) U.S. Cl. .......................................... 33/293; 33/506
(58) Field of Search ........................ 33/293, 1 H, 1 BB, 33/121, 295, 506

(56) References Cited

U.S. PATENT DOCUMENTS

| | | | |
|---|---|---|---|
| 3,271,865 A | * | 9/1966 | Glidden et al. ................ 33/295 |
| 4,206,919 A | * | 6/1980 | Della Rovere ............... 273/364 |
| 4,488,809 A | * | 12/1984 | Miller et al. .................. 33/293 |
| 4,549,360 A | * | 10/1985 | Allen .......................... 33/293 |
| 4,784,483 A | * | 11/1988 | Holladay et al. ........... 351/243 |
| 4,926,563 A | | 5/1990 | Smith |
| 4,964,218 A | * | 10/1990 | Morghen ...................... 33/293 |
| 4,970,794 A | * | 11/1990 | Buckley ....................... 33/293 |
| 5,062,753 A | | 11/1991 | Begue |
| 5,119,564 A | * | 6/1992 | Hamilton et al. ............. 33/293 |
| 5,771,099 A | | 6/1998 | Ehbets |
| 5,861,956 A | * | 1/1999 | Bridges et al. ............... 33/293 |
| 5,893,214 A | * | 4/1999 | Meier et al. .................. 33/293 |
| 6,299,122 B1 | * | 10/2001 | Bame .......................... 248/466 |

FOREIGN PATENT DOCUMENTS

| | | |
|---|---|---|
| FR | 2 720 496 | 12/1995 |
| FR | 2 747 466 | 10/1997 |
| WO | 97/27453 | 7/1997 |

* cited by examiner

*Primary Examiner*—Diego Gutierrez
*Assistant Examiner*—Yaritza Guadalupe
(74) *Attorney, Agent, or Firm*—Wenderoth, Lind & Ponack L.L.P.

(57) ABSTRACT

The device comprises a target member (4) and a support (1) for supporting the target member. The support includes a receptacle head (12) for the target member, including a housing (15) open to the outside via an outwardly flared frustoconical seat (16). The target member includes a flange (42) having a spherical annular lateral surface adapted to bear tangentially against the seat (16), and a plate (45) upstanding perpendicularly on the flange in an equatorial plane an imaginary sphere (44) of which the lateral surface of the spherical annular flange is part. The plate has two parallel plane retroreflecting faces and a hole (46) passing completely through it and centered on an axis perpendicular to the faces of the plate and passing through the center of the spherical surface, and the hole is open at both ends via a bevel (461).

19 Claims, 2 Drawing Sheets

RECTROREFLECTING METROLOGY TARGET MARKER DEVICE

BACKGROUND OF THE INVENTION

The invention concerns retroreflecting metrology devices used, in particular, to measure deformation of natural structures (the ground, rock formations) or manmade structures (civil engineering works, embankments, cuttings).

Metrology measurements on such structures are conventionally effected by rangefinders which use "Invar" (registered trademark) wires. In outline, they entail implanting supports in the structure whose dimensional evolution is to be checked, and wire attachment members are removably mounted on the supports. An adjustment member is used to stretch wires whose ends have been attached to two respective attachment members, measuring (allowing for the length of the wires) the distances between reference points of the attachment members, removing the equipment with the exception of the supports, and repeating the above operations each time the dimensional evolution of the structure is to be checked.

The supports are therefore permanently anchored in the structure but the rest of the equipment is removable. The attachment members have a structure such that merely knowing the distance between the respective attachment points of two members, between which one or more wires are stretched, enables the distance between the reference points thereof to be deduced so that, in the absence of deformation, the measurements are reproducible, even at intervals of several years, and so that the changes in the measured distances are a perfect reflection of the deformations of the structure. To enable measurements to be effected over a wide range of distances, wires of calibrated length can be joined together end-to-end. To obtain great accuracy, an attachment member, one or more wires, and an adjustment member comprising a section of measurable adjustable length and a calibrated tensioner are inserted between two reference points. Thus, the wires are always tensioned with the same tension. As the are made of Invar, their length varies little with temperature. The distance between the two, reference points in a straight line from one reference point to the other is therefore equal to the sum of the lengths of the wires tensioned to the appropriate tension plus the length of the adjustment member plus the length of the attachment member between the calibrated wire and the corresponding reference point. The reproducibility of the measurements is naturally related to the necessity for the reference point to always be identically positioned relative to the supports of all the attachment members.

FIG. 1 illustrates the use of such rangefinders to measure changes in the cross section of the vault of a tunnel, for example a railway tunnel in an underground station.

Seven supports, each of which can removably carry an attachment member, are anchored in the plane of the cross section. A support A is anchored into the keystone, two supports B and C are symmetrically anchored at the corners of the platforms overlying the tracks, two supports D and E are symmetrically anchored to the skewbacks of the vault at the same level, and two supports F and G are symmetrically anchored in the vault or at the springers, at the same level, respectively between the supports D and E and the keystone support A.

The wires are respectively tensioned between B and D, D and F, F and A, A and G, G and E, E and C, C and B, and there are therefore only seven distances to be measured.

With seven supports it is theoretically possible to check 21 distances, but in most cases it is sufficient to check 17 distances to obtain a good image of the evolution of the structure.

FIG. 2 shows diagrammatically a device including a support 1 and an attachment member 2 (which are known in the art), and an assembly member 3 by means of which the attachment member is fixed to the support.

The support 1 includes, along a central axis, a support base 11 adapted to be fixed into the structure whose evolution is to be checked, and a receptacle head 12 connected by a transition region 13. The head 12 is adapted to carry the assembly member, externally of the structure. The support base can have projections at its perimeter to anchor it more reliably into the structure, for example a longitudinal succession of annular projections or a screwthread of appropriate profile if it is cylindrical (not shown). It can be anchored by embedding it in resin or in expanding cement, for example. The head 12 is generally cylindrical and has an external screwthread 14 to enable the assembly member 3, which has an inside screwthread 31 for this purpose, to be screwed onto it. The transition region 13 is frustoconical. The head 12 includes a generally cylindrical housing 15 open to the outside at the free end opposite the support base 11 via a frustoconical seat 16 consisting of a bevel at an angle in the range of approximately 40° to approximately 50°. For technological reasons, the outside screwthread 14 preferably does not extend as far as the free end of the support, and in the region of the free end of the support the outside diameter of the support is not greater than the diameter at the root of the screwthread.

The attachment member 2 is made up of several components, and to be more precise includes a bush 21 having a generally cylindrical body adapted to be inserted into the housing 15 and a flange which bears on the frustoconical seat 16. The bush 21 includes a central passage in which is accommodated a fixing rod 22 for an attachment finger 23 fixed to the rod externally of the head 12 to pivot about a pivot 24 perpendicular to the longitudinal central axis of the support 1. The fixing rod 22 has a screwthread along its end region accommodated in the head 12 onto which is screwed a nut for fixing the rod to the bush, bearing against a face of the bush with a washer between them. The pivot 24 is accommodated in a transverse bore in the opposite end region of the fixing rod 22. This region of the fixing rod has an area which bears against the face of the flange of the bush 21 outside the head 12 so that the longitudinal axis of the pivot 24 is at a fixed distance from the outside face of the flange. The point of intersection of the axis of the pivot 24 and of the longitudinal central axis of the support 1 to which it is perpendicular therefore constitutes the reference point of the attachment member 2. The axis of the pivot 24 can therefore be oriented in any direction in the plane parallel to the face of the flange external to the head 12 at a distance equal to that between the reference point and that face, and the attachment finger 23 can be pivoted in a vertical plane through an angle of at least 180° if its outside shape is chosen accordingly. The attachment finger 23 has a hook for attaching Invar wires near its end opposite its articulation to the pivot 24.

The assembly member 3 takes the form of a ring forming a nut whose inside screwthread 31 cooperates with the outside screwthread 14 of the support 1. It has an inside surface 32 for clamping the flange against the head 12, with the lateral surface of the flange pressed against the frustoconical seat 16, and the outside surface of the ring can be knurled to facilitate tightening it.

When the respective attachment members of two devices as described above are connected to each other by Invar wires and an adjustment member, and the wires and the adjustment member have been aligned with the attachment finger 23, the distance whose evolution is to be checked is that between the longitudinal axes of the respective two pivots 24 of the two devices.

Repetitive measurements using the above equipment are time-consuming and costly and it is desirable to use simpler and faster means of studying the evolution of the same structures.

However, measurements effected until now by other techniques, in particular optical techniques, supply results that are comparable with those obtained using the equipment just described only after lengthy and difficult (or even impossible) corrections.

SUMMARY OF THE INVENTION

The object of the invention is to remedy these drawbacks and to provide optical measuring equipment which gives the same measurement results as the prior art equipment in the absence of evolution in the structures checked, in order to avoid any problem of continuity in studying the evolution of structures previously checked by means of the prior art equipment.

To this end, the invention therefore concerns a retroreflecting metrology target marker device comprising a target member and a support for that target member. The support includes a receptacle head for inserting a target member, and the receptacle head includes a housing into which the target member is inserted from the outside via an outwardly flared frustoconical seat. The target member includes a flange having a spherical annular lateral surface adapted to bear tangentially against the frustoconical seat, and a plate extending out of the support and upstanding perpendicularly on the flange in an equatorial plane of a spherical surface of which the lateral surface of the spherical ring flange is part. The plate has two parallel plane faces, at least one of which is retroreflecting or covered with a retroreflecting coating, and includes a hole passing completely through it and centered on an axis perpendicular to the faces of the plate and passing through the center of the spherical surface.

By virtue of the above structure, it is possible to provide a target member adapted to be inserted not only in a support provided especially for it, but also in a prior art support originally adapted to receive an Invar wire attachment member. IN addition, measurements can be performed using a theodolite, to obtain identical measurement results for the same structure, if it has not undergone any deformation. Thus, the dimensional evolution of the structure can be checked without aberrant results or interruptions due to changing the measuring method.

The device according to the invention can also have one or more additional features. The hole passing through the plate can have at least one frustoconical region through which it opens to the outside, in a flared fashion, to optimize inclined sighting. The hole passing through the plate can have two frustoconical regions through which it opens to the outside on respective opposite sides of the plate, in flared fashion, to optimize inclined sighting. Both faces of the plate can be retroreflecting or covered with a retroreflecting coating. The hole passing through the plate can have at least one frustoconical region through which it opens to the outside, in flared fashion, and the inclination of the wall of the frustoconical region to the axis on which the hole is centered can be from approximately 35° to approximately 45°. The plate can be upstanding on a circular increased thickness portion of one face of the flange. The target member can include a generally cylindrical body joined to the flange and adapted to be inserted into the housing of the receptacle head of the support. The support can include a support base adapted to be anchored into a structure on which metrology measurements are to be effected. The device can also include an assembly member in the form of a ring forming a nut having an inside screwthread cooperating with an outside screwthread of the receptacle head of the support and an inside surface for clamping the flange against the head, and the spherical surface can be part of a sphere having a diameter from approximately 25 mm to approximately 35 mm.

BRIEF DESCRIPTION OF THE DRAWINGS

Other features and advantages of the invention will emerge from the following description of one embodiment of the invention, which description is given by way of a non-limiting example and is illustrated by the accompanying drawings, in which.

DETAILED DESCRIPTION OF THE INVENTION

Figure 1:
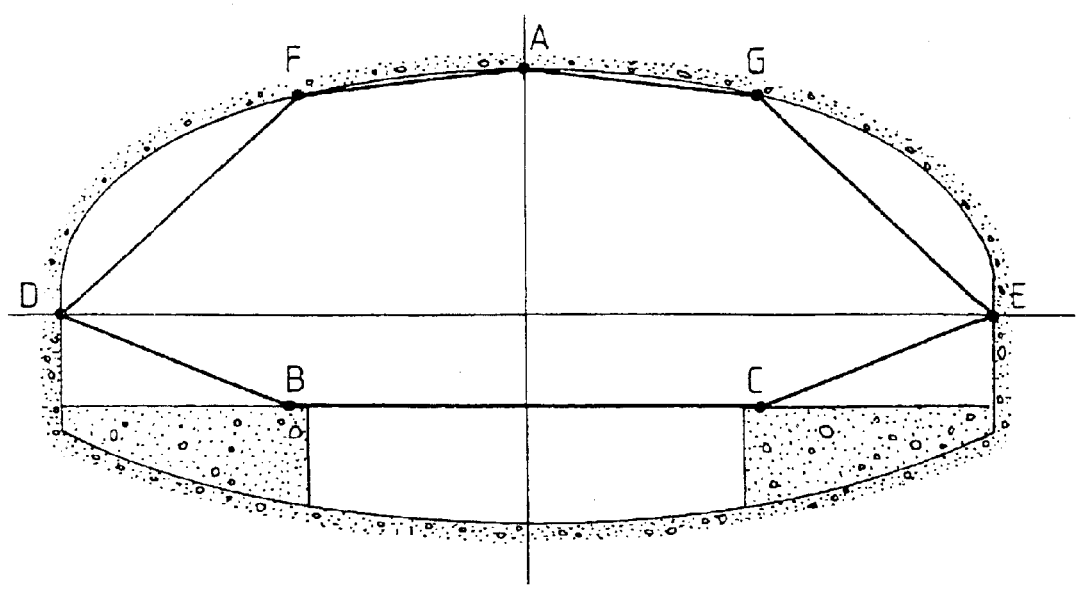
FIG. 1 is a diagram showing prior art metrology devices for dimensional measurements on a tunnel.
Figure 2:
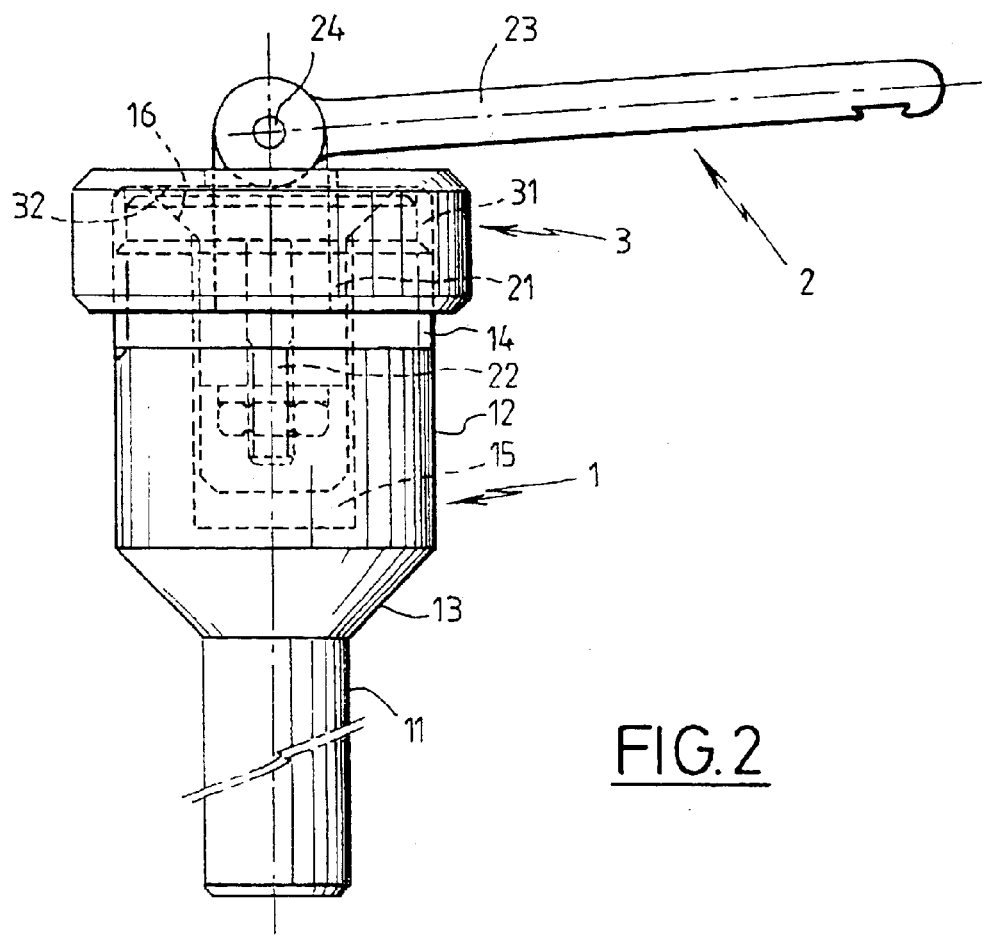
FIG. 2 is a diagrammatic external view of one embodiment of a prior art metrology device.
Figure 3:
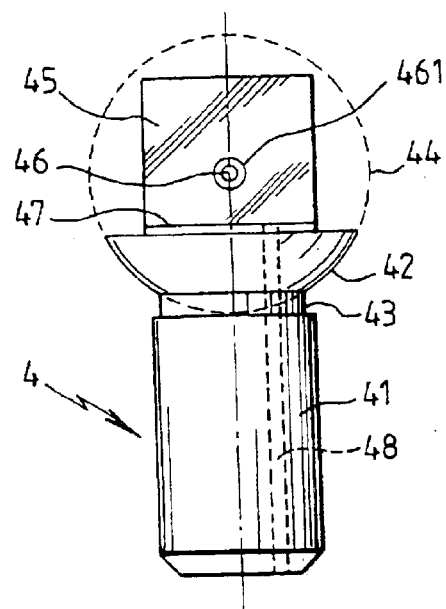
FIG. 3 is a diagrammatic front view of a target member included in a target marker device according to the invention.
Figure 4:
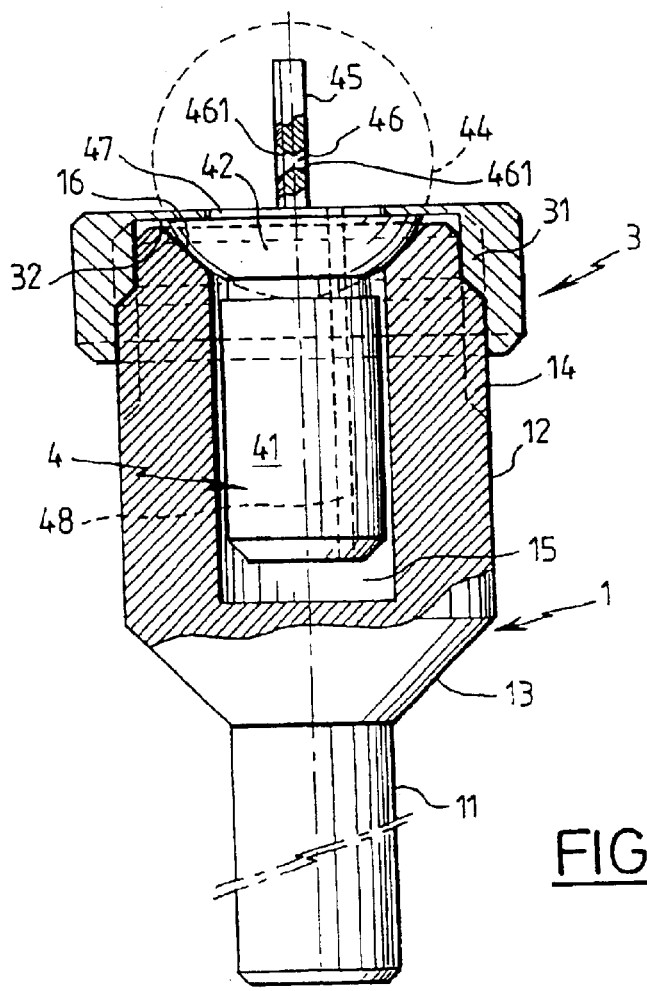
FIG. 4 is a diagrammatic partial view in longitudinal section of a target marker device according to the invention, including the target member from FIG. 3, which is shown in profile.

Components in FIGS. 3 and 4 identical to components in FIG. 2 are designated by the same reference numbers. The target marker device according to the invention shown in FIG. 4 includes, like the prior art device shown in FIG. 2, a support 1, and a member 4 adapted to be inserted into the support 1 and an assembly member 3 by means of which that member is fixed to the support 1. However, the member adapted to be inserted into the support 1 is not an Invar wire attachment member but a target member 4 described below and shown in FIG. 3.

Similar to FIG. 2, the support 1 of the device according to the invention includes, along a central axis, a support base 11 adapted to be fixed into the structure whose evolution is to be checked, and a receptacle head 12 joined by a transition region 13. The head 12 is adapted to carry the assembly member, externally of the structure. The support base can have projections at its perimeter to make the anchorage in the structure more reliable. For example, the support base can include a longitudinal succession of annular projections or a screwthread having an appropriate profile, with anchorage being effected by embedding the device in resin or expanding cement, for example.

The head 12 is cylindrical and has an outside screwthread 14 for screwing on the assembly member 3, which has an inside screwthread 31. The transition region 13 is frustoconical. The head 12 includes a generally cylindrical housing 15 open to the outside at the free end of the support opposite the support base 11 via a frustoconical seat 16 consisting of a bevel whose angle is in a range from approximately 40° to approximately 50° (i.e., whose cone angle is from approximately 80° to approximately 100°). The outside screwthread 14 preferably does not reach this free end of the support and in the region of this end the outside diameter of the support is not greater than the diameter at the root of the screwthread.

The target member 4 includes a generally cylindrical body 41 adapted to be inserted into the housing 15 with a smooth sliding fit or a slight clearance in the housing, and a bearing flange 42 to be supported on the frustoconical seat 16, and the flange 42 is preferably joined to the body by a groove 43. The flange 42 has a spherical annular lateral surface adapted to bear tangentially against the outwardly flared seat 16, the spherical ring being part of a spherical surface 44 of an imaginary sphere centered on the central axis of the support 1, which is also that of the cylindrical housing 15 and the seat 16. On the face of the flange 42 opposite that to which the body 41 is connected by the groove 43 is a plate 45 upstanding perpendicularly in an equatorial plane of the spherical surface 44 and adapted to extend out of the support when the target member is inserted in the housing 15.

The plate 45 has two parallel plane faces at least one of which is retroreflecting or has a retroreflective coating to constitute a sighting surface; both faces are preferably retroreflecting or have a retroreflecting coating for visible light rays or rays at wavelengths close to the visible spectrum in order to constitute two sighting Surfaces, the plate includes a hole 46 for optimizing sighting, and the hole passes completely through the plate 45 and is centered on an axis which is perpendicular to the faces of the plate and to the longitudinal axis of the housing 15 and the seat 16 and also passes through the center of the imaginary sphere 44. The hole 46 preferably has a circular cross section throughout its length, and can have a cylindrical central portion and at least one frustoconical region or countersink 461 through which it opens to the outside in a flared fashion. The hole 46 preferably has two frustoconical regions 461 opening to the outside in a flared fashion on respective opposite sides of the plate 45. Because the plate is generally thin, the hole generally has no cylindrical central portion of significant length, and the two frustoconical regions or countersinks 461 are joined at their smaller base.

If one or each face has a retroreflecting coating, the coating naturally has a hole through it whose shape and dimensions are the same as those of the hole in the plate in the same area. The retroreflecting coating is advantageously a retroreflecting adhesive film.

The inclination of the facing 461 relative to the axis of the hole is preferably from approximately 35° to 45° to facilitate sighting by means of a theodolite.

The plate 45 is upstanding on a circular increased thickness base portion 47 of the face of the flange 42 opposite that to which the body 41 is attached, and the function of the base is explained below. The thickness of the plate 45 is a few millimeters, for example from approximately 1 mm to approximately 5 mm.

For a seat 16 which extends between a small diameter of approximately 20 mm and a large diameter of approximately 30 mm, the diameter of the imaginary sphere 44 is from approximately 25 mm to approximately 35 mm.

A passage 48, which is cylindrical, for example, passes completely through the body 41, the groove 43, the flange 42 and the increased thickness base portion 47 to facilitate the insertion of the body 41 into the housing 15 by enabling the air contained therein to escape as the body 41 advances into the housing.

The assembly member 3 is shaped as a ring forming a nut whose inside screwthread 31 cooperates with (engages) the outside screwthread 14 on the support 1 and has an inside surface abutment portion 32 for clamping the flange 42 against the head 12. The spherical surface of the flange is pressed against the frustoconical surface of the seat 16 so that the surface of seat 16 is tangential to the frustoconical surface. The ring can be knurled or provided with flats to facilitate tightening it.

The dimensions of the circular increased thickness base portion 47 of the flange 42 are adapted to enable the increased thickness base portion to be inserted into the central hole of the ring 3 surrounded by (abutted against) the inside clamping surface 32 with the outside face of the ring almost perfectly flush with the face of the increased thickness base portion that carries the plate 45. This arrangement enables the entire retroreflecting surface of the plate to be used for measurements perpendicular to that surface.

When the respective target members of the two devices described above are in place, the distance whose evolution is to be checked is that between the respective holes of the target members, as measured by an optical technique, for example using a tacheometer or electronic theodolite with infrared rangefinder. This kind of measurement is fast even when a large number of distances is to be measured, and lends itself to automatic logging of the results.

The structure that has just been described also makes the target members according to the invention interchangeable with the prior art attachment members and particularly members forming part of devices known as orientable rangefinders, using the same supports anchored in the structure to be measured and producing the same results.

What is claimed is:

1. A retroreflecting metrology target marker device comprising:
   a target member including:
      a flange having a spherical annular lateral surface with a radius equal to a radius of an imaginary sphere; and
      a plate standing erect on said flange in an equatorial plane of the imaginary sphere so as to be perpendicular to said flange, said plate having two parallel planar faces, at least one of said planar faces having a retroreflecting surface, said plate having a hole extending entirely through said plate and having a longitudinal center axis perpendicular to each of said planar faces and extending through the center of the imaginary sphere; and
   a support for supporting said target member so that said plate of said target member extends from said support, said support including a receptacle head having a housing for receiving said target member, said housing having an open end open to the atmosphere, said open end having an outwardly-flared frustoconical seat tangentially bearing against said spherical annular lateral surface of said flange.

2. The device of claim 1, wherein said hole has a first end open to the atmosphere and has a second end open to the atmosphere, at least one of said first end and said second end having an outwardly-flared frustoconical region.

3. The device of claim 2, wherein said first end and said second end of said hole each have an outwardly-flared frustoconical region.

4. The device of claim 1, wherein each of said planar faces has a retroreflecting surface.

5. The device of claim 1, wherein said hole has a first end open to the atmosphere and has a second end open to the atmosphere, at least one of said first end and said second end having an outwardly-flared frustoconical region, a wall of said outwardly-flared frustoconical region being inclined at an angle of approximately 35° to approximately 45° with respect to the longitudinal center axis of said hole.

6. The device of claim 1, wherein said target member has a circular base portion, said plate standing on said circular base portion.

7. The device of claim 1, wherein said target member further includes a generally cylindrical body connected to said flange and shaped so as to be inserted into said housing of said receptacle head of said support.

8. The device of claim 1, wherein said support further includes a support base shaped so as to be anchored into a structure to be metrologically measured.

9. The device of claim 1, further comprising a ring-shaped assembly member having an inner screwthread, said receptacle head having an outer screwthread for engaging said inner screwthread of said assembly member, said assembly member being shaped and arranged so that an inner abutment surface of said assembly member clamps said flange of said target member against said receptacle head of said support when said assembly member is threaded onto said receptacle head.

10. The device of claim 1, wherein the imaginary sphere has a diameter in a range of approximately 25 mm to approximately 35 mm.

11. The device of claim 1, wherein said flange has a second surface opposite said spherical annular lateral surface, said plate standing on said second surface so as to be perpendicular to said second surface.

12. The device of claim 11, wherein said second surface has a planar circular base portion, said plate standing on said base portion so as to be perpendicular to said base portion.

13. The device of claim 1, wherein said flange of said target member is shaped and arranged so as to be inserted into said housing of said support such that said plate extends from an end of said support.

14. A retroreflecting metrology target marker device comprising:

a target member including:
    a flange having a spherical annular lateral surface with a radius equal to a radius of an imaginary sphere, and having a second surface opposite said spherical annular lateral surface; and
    a plate standing erect on said second surface of said flange in an equatorial plane of the imaginary sphere so as to be perpendicular to said second surface of said flange, said plate having two parallel planar faces, at least one of said planar faces of said plate having a retroreflecting surface, and said plate having a hole extending entirely through said plate and having a longitudinal center axis perpendicular to each of said planar faces and extending through the center of the imaginary sphere;

a support for supporting said target member so that said plate of said target member extends from said support, said support including a receptacle head having a housing for receiving said target member and having an outer screwthread, said housing having an open end open to the atmosphere, said open end having an outwardly-flared frustoconical seat tangentially bearing against said spherical annular lateral surface of said flange; and a ring-shaped assembly member having an inner screwthread for engaging said outer screwthread of said receptacle head, said assembly member being shaped and arranged so that an inner abutment surface of said assembly member abuts said second surface of said flange so as to clamp said flange of said target member against said receptacle head of said support when said assembly member is threaded onto said receptacle head.

15. The device of claim 14, wherein said hole has a first end open to the atmosphere and has a second end open to the atmosphere, at least one of said first end and said second end having an outwardly-flared frustoconical region.

16. The device of claim 15, wherein said first end and said second end of said hole each have an outwardly-flared frustoconical region.

17. The device of claim 14, wherein each of said planar faces has a retroreflecting surface.

18. The device of claim 14, wherein said hole has a first end open to the atmosphere and has a second end open to the atmosphere, at least one of said first end and said second end having an outwardly-flared frustoconical region, a wall of said outwardly-flared frustoconical region being inclined at an angle of approximately 35° to approximately 45° with respect to the longitudinal center axis of said hole.

19. The device of claim 14, wherein said target member further includes a generally cylindrical body connected to said flange and shaped so as to be inserted into said housing of said receptacle head of said support.

* * * * *